March 21, 1939.　　　M. G. ROBINSON　　　2,151,564

REFRIGERATING MACHINE

Filed Oct. 29, 1937

Inventor:
Manuel G. Robinson,
by Harry E. Dunham
His Attorney.

Patented Mar. 21, 1939

2,151,564

UNITED STATES PATENT OFFICE 2,151,564

REFRIGERATING MACHINE

Manuel G. Robinson, Lynn, Mass., assignor to General Electric Company, a corporation of New York Application October 29, 1937, Serial No. 171,679

11 Claims. (Cl. 62—115)

My invention relates to refrigerating machines of the compression type.

It is an object of my invention to provide a refrigerating machine of the compression type having a compact casing arrangement, which may be readily assembled and which is economical to manufacture.

Another object of my invention is to provide a refrigerating machine including a casing having an improved arrangement including a cover for supporting a compressor and a driving motor therefor.

Further objects and advantages of my invention will become apparent as the following description proceeds and the features of novelty which characterize my invention will be pointed out with particularity in the claims annexed to and forming a part of this specification.

Figure 1:
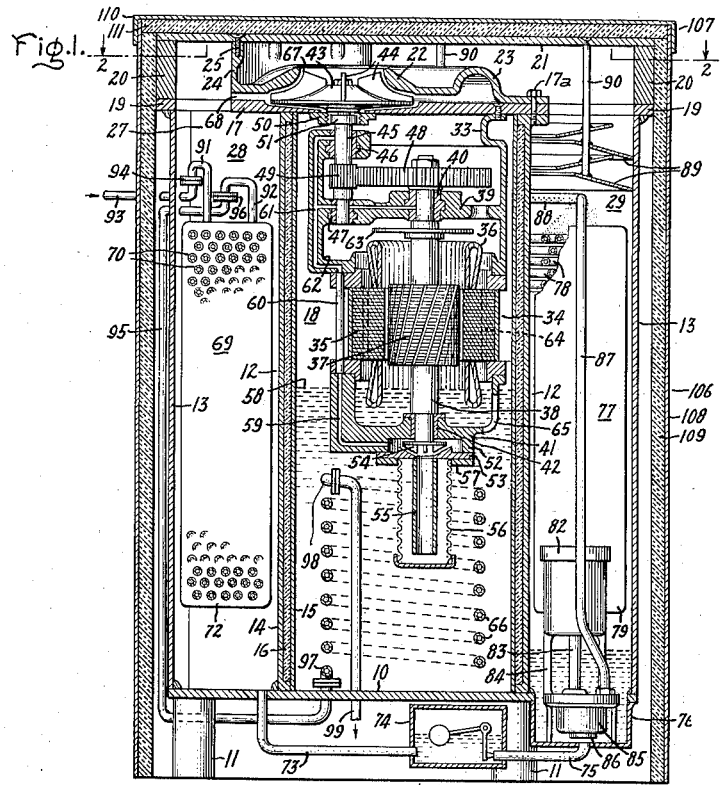
Figure 2:
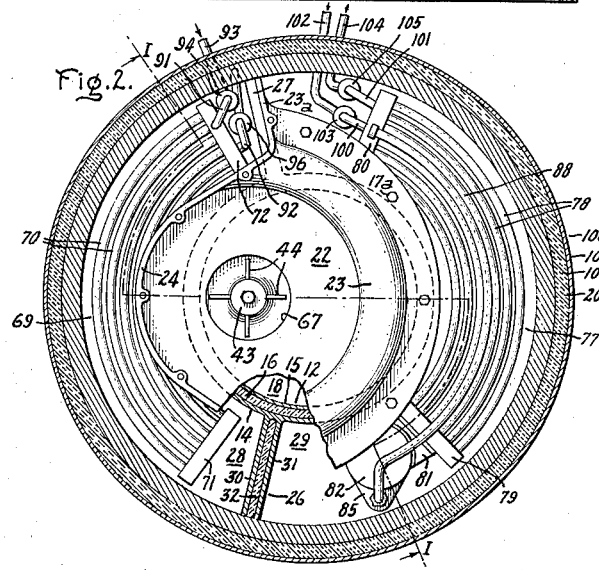

For a better understanding of my invention reference may be had to the accompanying drawing in which Fig. 1 is a vertical sectional view on the line 1—1 of Fig. 2 of a refrigerating machine embodying my invention; and Fig. 2 is a horizontal sectional view on the line 2—2 of Fig. 1 of the refrigerating machine.

Referring to the drawing, I have shown a refrigerating machine having a casing arrangement including a bottom wall 10 supported upon a plurality of spaced-apart feet 11, an upstanding side wall 12, and an upstanding side wall 13 surrounding the side wall 12 in spaced relation thereto and secured to the bottom wall 10. The side wall 12 comprises two concentrically arranged cylindrical members 14 and 15 secured to the bottom wall 10 and separated by a layer of heat insulation 16. A removable cover 17 is secured to the upper end of the side wall 12 and cooperates with the side wall 12 and the bottom wall 10 to provide an upstanding tubular inner casing defining a motor compartment 18 therein. A ring 19 is secured to the upper end of the side wall 13 and carries a spacer ring 20 to which a removable cover 21 is secured.

The cover 17 constitutes a section of the casing of a centrifugal compressor 22 and provides a diffuser plate for the centrifugal compressor. The centrifugal compressor 22 is also provided with a complementary casing section 23 secured to the cover 17 by a series of bolts 17a and having an upwardly directed flange 24 secured to the cover 21 by a series of bolts 25. The bottom wall 10, the side wall 13, the rings 19 and 20, the cover 21, and the compressor casing section 23 cooperate to provide an upstanding tubular outer casing surrounding the tubular inner casing in which the motor compartment 18 is defined. An arrangement including two spaced-apart dividing walls 26 and 27 arranged between and secured to the side walls 12 and 13 and secured to two spaced-apart outwardly extending projections 23a provided on the compressor casing section 23 is provided to define a condenser compartment 28 and an evaporator compartment 29 in the tubular outer casing. It will be observed that the space between the side walls 12 and 13 is of annular configuration and that the dividing walls 26 and 27 subdivide this space into supplementary compartments, one compartment being the condenser compartment 28 and the other compartment being the evaporator compartment 29. The dividing wall 26, as best shown in Fig. 2, comprises two spaced-apart members 30 and 31 separated by a layer of heat insulation 32, and the dividing wall 27 is of a similar construction.

A bracket 33 secured to the lower surface of the cover 17 depends therefrom into the motor compartment 18 defined in the tubular inner casing. The bracket 33 carries a motor 34 which is preferably of the induction type and includes a stator 35 having a winding 36 and a rotor 37 mounted on a vertically disposed shaft 38. The bracket 33 is provided with a flange structure 39 which carries an upper bearing 40 for the shaft 38 and the motor 34 is provided with a lower end shield 41 which carries a lower thrust bearing 42 for the shaft 38. The centrifugal compressor 22 is provided with an impeller 43 having a plurality of spaced-apart blades 44 thereon and arranged between the cover 17 and the casing section 23. The impeller 43 is mounted on a vertically disposed shaft 45 which is journaled in upper and lower bearings 46 and 47, the upper and lower bearings 46 and 47 being carried by the flange structure 39 of the bracket 33. A driving connection including a relatively large gear 48 mounted on the shaft 38 and a relatively small pinion 49 mounted on the shaft 45 is provided between the shaft 38 and the shaft 45. The shaft 45 projects through an opening provided in the cover 17 and an annular collar 50 is disposed thereabout and secured to the cover 17. The shaft 45 is provided with an enlarged portion 51 arranged within the annular collar 50 and cooperates with the annular collar to provide a labyrinth seal between the motor compartment 18 and the interior of the centrifugal compressor 22.

The end shield 41 of the motor 34 is provided with a downwardly extending annular flange 52 which cooperates with a plate 53 secured thereto to provide a lubricant pump casing. The lower end of the shaft 38 projects within the lubricant pump casing and carries an impeller 54. An opening is provided within the plate 53 in alignment with the impeller 54 and a downwardly extending tube 55 is secured about the opening in the plate 53. The tube 55 has an open lower end and is surrounded by a cup-shaped reticulated screen 56 secured to the plate 53 by an annular ring 57.

The lower portion of the motor compartment 18 constitutes a lubricant reservoir containing a body of lubricant 58 which submerges the lubricant pump casing and the lower end turns of the winding 36 of the motor 34. During operation of the refrigerating machine lubricant is drawn from the lubricant reservoir through the reticulated screen 56 into the lower open end of the tube 55 and into the lubricant pump casing by the impeller 54, the reticulated screen 56 preventing any foreign matter from being drawn into the lubricant pump casing. The lubricant is then discharged from the lubricant pump casing through a passage 59 formed in the lower end shield 41 of the motor 34 into a conduit 60 communicating with a passage 61 formed in the flange structure 39 of the bracket 33. The lubricant is conducted through the passage 61 to the bearings 40, 46 and 47 in order to lubricate these bearings. Excess lubricant escaping from the bearing 46 is conducted along the shaft 45 to the pinion 49 in order to lubricate the pinion 49 and the gear 48 in mesh therewith. Excess lubricant escaping from the bearing 47 is caught in a recess 62 provided in the flange structure 39 and excess lubricant escaping from the bearing 40 is thrown from the shaft 38 by a deflector 63 carried by the shaft 38 into the recess 62. The lubricant accumulating in the recess 62 flows therefrom between the inner marginal portion of the recess 62 and the outer surface of the upper portion of the winding 36 and is conducted through a plurality of passages 64 formed in the stator 35 of the motor 34 back into the lower end shield 41 of the motor. The interior of the lower end shield 41 of the motor 34 communicates with the body of lubricant 58 contained in the lubricant reservoir through an opening 65 formed in the lower end shield. The lower thrust bearing 42 is adequately lubricated due to the fact that it is submerged in the body of lubricant 58 contained in the lubricant reservoir. This arrangement provides for adequate lubrication of the bearings of the motor and the compressor and the driving connection therebetween. Also, the motor is adequately cooled by the lubricant flowing through the passages 64 formed in the stator 35 thereof. The body of lubricant 58 contained in the lubricant reservoir is cooled by a heat exchange coil 66 arranged therein.

The compressor casing section 23 is provided with an annular inlet opening 67 therein in alignment with the impeller 43 and an elongated discharge opening 68 arranged between the cover 17 and the casing section 23. The refrigerating machine is charged with a refrigerant having a relatively low vapor pressure, such as tri-chlor-ethylene, for example, in order that the refrigerant may be adequately compressed by the centrifugal compressor 22. During operation of the refrigerating machine, vaporized refrigerant in thee vaporator compartment 29 is withdrawn therefrom through the annular inlet opening 67 in the casing section 23 of the centrifugal compressor 22 by the impeller 43. The vaporized refrigerant is compressed and discharged through the elongated discharge opening 68 into the condenser compartment 28 to be liquefied. An arrangement including a heat exchanger 69 is provided for liquefying the compressed refrigerant in the condenser compartment 28. The heat exchanger 69 is arranged within the condenser compartment 28 and comprises a plurality of spaced-apart arcuately-shaped tubes 70 interconnected at opposite ends by two spaced-apart headers 71 and 72. Compressed refrigerant is liquefied in the condenser compartment 28 and liquid refrigerant is conducted from the lower portion thereof through a conduit 73 to a float-operated flow-controlling device 74. The liquefied refrigerant is conducted from the float-operated flow-controlling device 74 through a conduit 75 into the lower portion of a liquid refrigerant sump 76 formed in the lower portion of the evaporator compartment 29. The float-operated flow-controlling device is arranged to admit liquid refrigerant into the liquid refrigerant sump 76 when a predetermined level of liquid refrigerant is contained in the casing of the float-operated flow-controlling device 74.

A heat exchanger 77 comprising a plurality of arcuately-shaped spaced-apart tubes 78 interconnected at opposite ends by two spaced-apart headers 79 and 80 is arranged within the evaporator compartment 29 to be cooled by the refrigerant therein. The header 79 is provided with a bracket 81 which supports a motor 82 having a vertically disposed shaft 83. The frame of the motor 82 is provided with a bracket arrangement 84 connected to the casing of a liquid refrigerant circulating pump 85. The liquid refrigerant circulating pump 85 is arranged within the liquid refrigerant sump 76 and draws liquid refrigerant therefrom through an inlet port 86 provided in the lower portion of the casing of the liquid refrigerant circulating pump 85. The liquid refrigerant is discharged from the casing of the liquid refrigerant circulating pump 85 through an upwardly directed conduit 87 into an arcuately-shaped header 88 disposed above the upper portion of the heat exchanger 77. The header 88 is perforated along its length in order to discharge liquid refrigerant in the form of a spray upon the tubes 78 of the heat exchanger 77. The liquid refrigerant flows over the outer surfaces of the tubes 78 and is returned to the liquid refrigerant sump 76. The liquid refrigerant circulating pump 85 is ararnged to discharge a greater quantity of liquid refrigerant over the outer surfaces of the tubes 78 of the heat exchanger 77 than is evaporated thereby in order to provide for recirculation of the liquid refrigerant and to insure that the outer surfaces of the tubes 78 will be completely wetted with a film of liquid refrigerant. An arrangement including a plurality of oppositely inclined and overlapping arcuately-shaped baffles 89 is provided for preventing the spray of liquid refrigerant discharged from the header 88 upon the heat exchanger 77 from being drawn into the annular inlet opening 67 of the centrifugal compressor 22. This arrangement allows vaporized refrigerant to be withdrawn from the evaporator compartment 29 and prevents the spray of liquid refrigerant from being withdrawn therewith. The baffles 89 are secured to a plurality of depending supports 90 carried by the removable cover 21.

The heat exchanger 69 arranged in the condenser compartment 28 is provided with an inlet connection 91 and an outlet connection 92 which are connected respectively to an inlet conduit 93 by a flanged coupling 94 and a conduit 95 by a flanged coupling 96. The flanged couplings 94 and 96 are arranged between the header 72 of the heat exchanger 69 and the dividing wall 27 in order to accommodate ready removal of the heat exchanger 69 from the condenser compartment 28. The heat exchange coil 66 is provided with an inlet end 97 and an outlet end 98 connected respectively to the inlet conduit 95 and an outlet conduit 99. The heat exchanger 69 and the heat exchange coil 66 are connected in series circuit relationship and during operation of the refrigerating machine cooling liquid is supplied from the inlet conduit 93 to the heat exchanger 69. The cooling liquid flows through the heat exchanger 69 into the conduit 95 and is supplied to the heat exchange coil 66. The cooling liquid flows through the heat exchange coil 66 and is discharged through the outlet conduit 99. The heat exchanger 77 arranged in the evaporator compartment 29 is provided with an inlet connection 100 and an outlet connection 101 which are connected respectively to an inlet conduit 102 by a flanged coupling 103 and an outlet conduit 104 by a flanged coupling 105. During operation of the refrigerating machine, the medium to be cooled is conducted from the inlet conduit 102 through the heat exchanger 77 into the outlet conduit 104. The cooling medium is then conducted from the outlet conduit 104 to any suitable heat exchange device utilizing the refrigeration produced by the refrigerating machine described.

The refrigerating machine is arranged within a suitable heat insulated finished case comprising an upstanding cylindrical body portion 106 and a cover 107 which is removably secured thereto in any suitable manner. The upstanding body portion 106 comprises a metal outer wall 108 and a layer of heat insulation 109 arranged in spaced relation to the side wall 13 of the tubular outer casing of the refrigerating machine. The cover 107 comprises a metal outer wall 110 and a layer of heat insulation 111 arranged adjacent the removable cover 21 of the tubular outer casing of the refrigerating machine.

In assembling the refrigerating machine described, the heat exchanger 69 is arranged within the condenser compartment 28 and the inlet and outlet connections 91 and 92 thereof are connected respectively to the flanged couplings 94 and 96. The heat exchanger 77 carrying the motor 82 and the liquid refrigerant circulating pump 85 is arranged within the evaporator compartment 29 and the inlet and outlet connections 100 and 101 thereof are connected respectively to the flanged couplings 103 and 105. The assembled cover 17, centrifugal compressor 22 and motor 34 are then brought into superimposed relationship with respect to the side wall 12 of the tubular inner casing of the refrigerating machine and the motor 34 is lowered into the motor compartment 18 defined in the tubular inner casing. The cover 17 is then secured in place upon the upper end of the side wall 12. The removable cover 21 carrying the baffles 69 is then brought into superimposed relationship with respect to the tubular outer casing of the refrigerating machine. The removable cover 21 is then lowered into place and secured to the upwardly directed flange 24 provided on the compressor casing section 23 and to the spacer ring 20. The removable cover 107 of the heat insulated finished case is then placed upon the upper end of the upstanding body portion 106 thereof. From the foregoing description of the refrigerating machine, it is apparent that the motor 34 may be readily removed from the motor compartment 18 defined in the tubular inner casing and that the heat exchangers 69 and 77 may be readily removed from the condenser compartment 28 and the evaporator compartment 29 respectively.

While I have shown a particular embodiment of my invention in connection with a refrigerating machine having a compressor of the centrifugal type, I do not desire my invention to be limited to the particular construction shown and described, and I intend in the appended claims to cover all modifications within the spirit and scope of my invention.

What I claim as new and desire to secure by Letters Patent of the United States, is:

1. A refrigerating machine comprising an inner casing defining a motor compartment, a motor arranged in said motor compartment, an outer casing surrounding said inner casing and cooperating therewith to define a condenser compartment and an evaporator compartment, means including a compressor driven by said motor for withdrawing vaporized refrigerant from said evaporator compartment and for discharging compressed refrigerant into said condenser compartment, means including a heat exchanger arranged in said condenser compartment for liquefying the compressed refrigerant therein, means for conducting liquid refrigerant from said condenser compartment to said evaporator compartment, and another heat exchanger arranged in said evaporator compartment and cooled by the refrigerant therein.

2. A refrigerating machine comprising an inner casing defining a motor compartment, a motor arranged in said motor compartment, an outer casing surrounding said inner casing and cooperating therewith to define a condenser compartment and an evaporator compartment, means including a compressor driven by said motor for withdrawing vaporized refrigerant from said evaporator compartment and for discharging compressed refrigerant into said condenser compartment, means including a heat exchanger arranged in said condenser compartment for liquefying the compressed refrigerant therein, means for conducting liquid refrigerant from said condenser compartment to said evaporator compartment, another heat exchanger arranged in said evaporator compartment and cooled by the refrigerant therein, and means for recirculating liquid refrigerant in said evaporator compartment over the outer surface of said heat exchanger therein.

3. A refrigerating machine comprising an inner casing defining a motor compartment, a motor arranged in said motor compartment, an outer casing surrounding said inner casing in spaced relation thereto and cooperating therewith to define a condenser compartment and an evaporator compartment therebetween, means including a compressor driven by said motor for withdrawing vaporized refrigerant from said evaporator compartment and for discharging compressed refrigerant into said condenser compartment, means including a heat exchanger arranged in said condenser compartment for liquefying the compressed refrigerant therein, means for conducting liquid refrigerant from said condenser compartment to said evaporator compartment, another heat exchanger arranged in said evaporator compartment and cooled by the refrigerant therein, means including a heat exchanger contained in said motor compartment for cooling said motor arranged therein.

4. A refrigerating machine comprising an inner casing having a removable cover and defining a motor compartment, a motor arranged in said motor compartment and carried by said cover, an outer casing surrounding said inner casing and cooperating therewith to define a condenser compartment and an evaporator compartment, means including a compressor driven by said motor for withdrawing vaporized refrigerant from said evaporator compartment and for discharging compressed refrigerant into said condenser compartment, means including a heat exchanger arranged in said condenser compartment for liquefying the compressed refrigerant therein, means for conducting liquid refrigerant from said condenser compartment to said evaporator compartment, and another heat exchanger arranged in said evaporator compartment and cooled by the refrigerant therein.

5. A refrigerating machine comprising an inner casing having a removable cover and defining a motor compartment, a motor arranged in said motor compartment and carried by said cover, an outer casing surrounding said inner casing and cooperating therewith to define a condenser compartment and an evaporator compartment, means including a compressor carried by said cover and driven by said motor for withdrawing vaporized refrigerant from said evaporator compartment and for discharging compressed refrigerant into said condenser compartment to be liquefied therein, and means for conducting liquid refrigerant from said condenser compartment to said evaporator compartment.

6. A refrigerating machine comprising an inner casing having a removable cover and defining a motor compartment, a motor arranged in said motor compartment and carried by said cover, an outer casing surrounding said inner casing and cooperating therewith to define a condenser compartment and an evaporator compartment, means including a compressor carried by said cover and driven by said motor for withdrawing vaporized refrigerant from said evaporator compartment and for discharging compressed refrigerant into said condenser compartment to be liquefied therein, means including a heat exchanger contained in said motor compartment for cooling said motor arranged therein.

7. A refrigerating machine comprising an inner casing having a removable cover and defining a motor compartment, a motor arranged in said motor compartment and carried by said cover, an outer casing surrounding said inner casing in spaced relation thereto and cooperating therewith to define a condenser compartment and an evaporator compartment therebetween, means including a compressor carried by said cover and driven by said motor for withdrawing vaporized refrigerant from said evaporator compartment and for discharging compressed refrigerant into said condenser compartment, means including a heat exchanger arranged in said condenser compartment for liquefying the compressed refrigerant therein, means for conducting liquid refrigerant from said condenser compartment to said evaporator compartment, and another heat exchanger arranged in said evaporator compartment and cooled by the refrigerant therein.

8. A refrigerating machine comprising a tubular inner casing defining a motor compartment, a motor arranged in said motor compartment, a tubular outer casing surrounding said inner casing in spaced relation thereto and cooperating therewith to define a condenser compartment and an evaporator compartment therebetween, means including a compressor driven by said motor for withdrawing vaporized refrigerant from said evaporator compartment and for discharging compressed refrigerant into said condenser compartment, means including a heat exchanger arranged in said condenser compartment for liquefying the compressed refrigerant therein, means for conducting liquid refrigerant from said condenser compartment to said evaporator compartment, and another heat exchanger arranged in said evaporator compartment and cooled by the refrigerant therein.

9. A refrigerating machine comprising an upstanding tubular inner casing having a removable cover and defining a motor compartment, a motor arranged in said motor compartment and carried by said cover, an upstanding tubular outer casing surrounding said inner casing in spaced relation thereto and cooperating therewith to define a condenser compartment and an evaporator compartment therebetween, means including a compressor carried by said cover and driven by said motor for withdrawing vaporized refrigerent from said evaporator compartment and for discharging compressed refrigerant into said condenser compartment to be liquefied therein, means for conducting liquid refrigerant from said condenser compartment to said evaporator compartment, said outer casing having a removable cover to provide for removal of said cover of said inner casing together with said motor and said compressor carried thereby.

10. A refrigerating machine comprising an upstanding tubular inner casing defining a motor compartment, a motor arranged in said motor compartment, an upstanding tubular outer casing surrounding said inner casing in spaced relation thereto and cooperating therewith to define a condenser compartment and an evaporator compartment therebetween, means including a compressor driven by said motor for withdrawing vaporized refrigerant from said evaporator compartment and for discharging compressed refrigerant into said condenser compartment, means including a heat exchanger arranged in said condenser compartment for liquefying the compressed refrigerant therein, means for conducting liquid refrigerant from said condenser compartment to said evaporator compartment, and another heat exchanger arranged in said evaporator compartment and cooled by the refrigerant therein.

11. A refrigerating machine comprising an upstanding tubular inner casing having a removable cover and defining a motor compartment, a motor arranged in said motor compartment and carried by said cover, an upstanding tubular outer casing surrounding said inner casing in spaced relation thereto and cooperating therewith to define a condenser compartment and an evaporator compartment therebetween, means including a compressor carried by said cover and driven by said motor for withdrawing vaporized refrigerant from said evaporator compartment and for discharging compressed refrigerant into said condenser compartment, means including a heat exchanger arranged in said condenser compartment for liquefying the compressed refrigerant therein, means for conducting liquid refrigerant from said condenser compartment to said evaporator compartment, and another heat exchanger arranged in said evaporator compartment and cooled by the refrigerant therein, said outer casing having a removable cover to provide for removal of said heat exchangers and said cover of said inner casing together with said motor and said compressor carried thereby.

MANUEL G. ROBINSON.